United States Patent [19]

Takeda et al.

[11] Patent Number: 4,582,182

[45] Date of Patent: Apr. 15, 1986

[54] LOCK-UP CONTROL AND METHOD THEREOF

[75] Inventors: Hitoshi Takeda; Sadao Takase, both of Yokohama, Japan

[73] Assignee: Nissan Motor Co., Ltd., Yokohama, Japan

[21] Appl. No.: 657,958

[22] Filed: Oct. 5, 1984

[30] Foreign Application Priority Data

Oct. 7, 1983 [JP] Japan .................. 58-186884

[51] Int. Cl.$^4$ .................. B60K 41/22; B60K 41/28
[52] U.S. Cl. .................. 192/3.31; 192/0.052; 192/0.092; 192/3.58; 74/732
[58] Field of Search .................. 192/3.28, 3.29, 3.3, 192/3.31, 3.33, 3.58, 0.052, 0.076, 0.092; 74/731, 732, 733; 361/242

[56] References Cited

U.S. PATENT DOCUMENTS

| 4,431,095 | 2/1984 | Suga | 192/3.31 |
| 4,457,410 | 7/1984 | Suga et al. | 192/0.052 |
| 4,539,869 | 9/1985 | Suga et al. | 74/731 |

Primary Examiner—George H. Krizmanich
Attorney, Agent, or Firm—Schwartz, Jeffery, Schwaab, Mack, Blumenthal & Evans

[57] ABSTRACT

A lock-up control wherein a temporary release timing of a bridge clutch is adjusted by learning control. According to the learning control, a difference between an estimated engine revolution speed after an instant when the bridge clutch is temporarily released and an actual engine revolution speed is obtained, an integral value is obtained by integrating the difference, and the temporary release timing is adjusted or corrected in such a manner as to decrease a difference between the integral value and a predetermined value.

6 Claims, 12 Drawing Figures

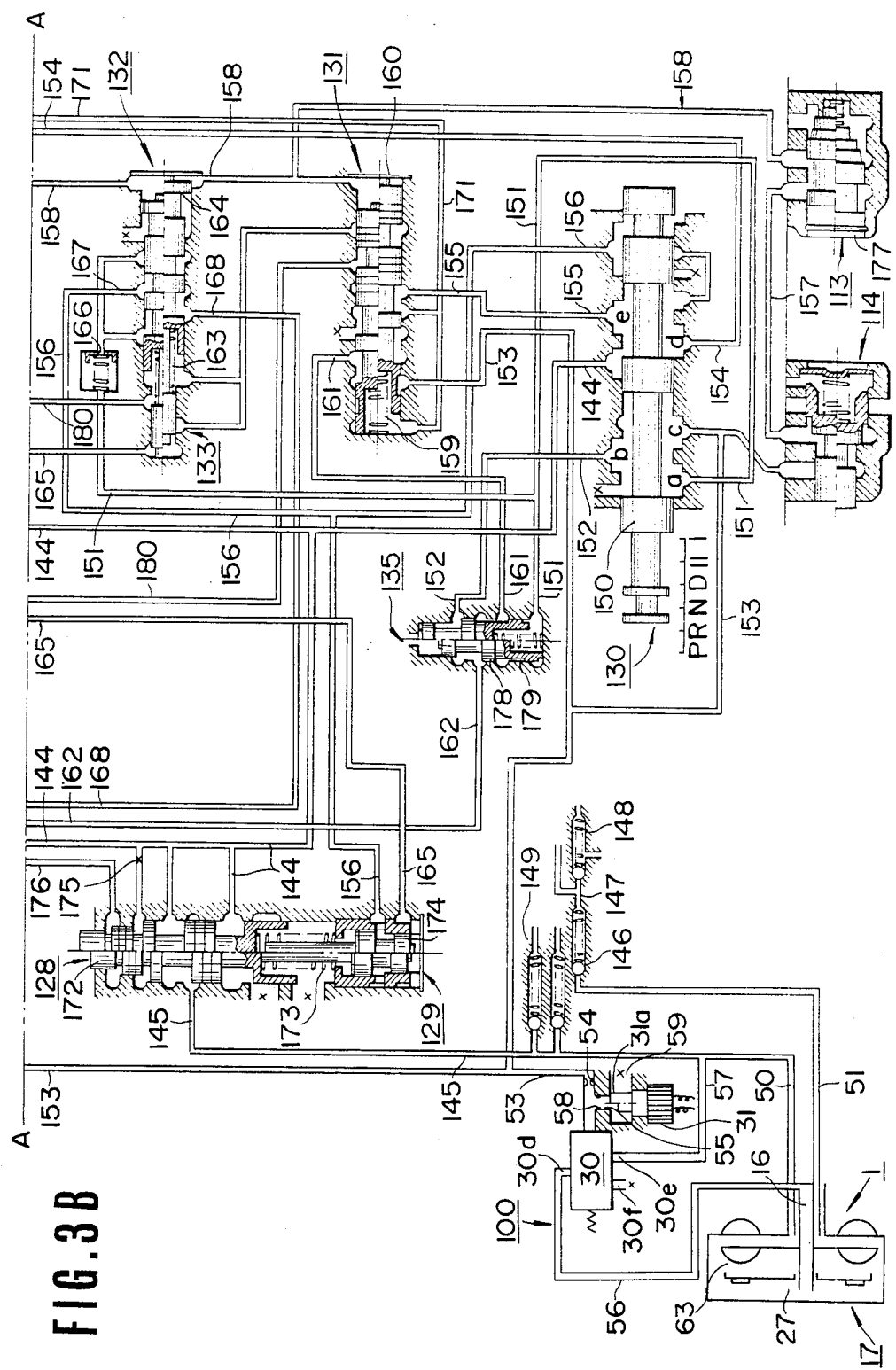

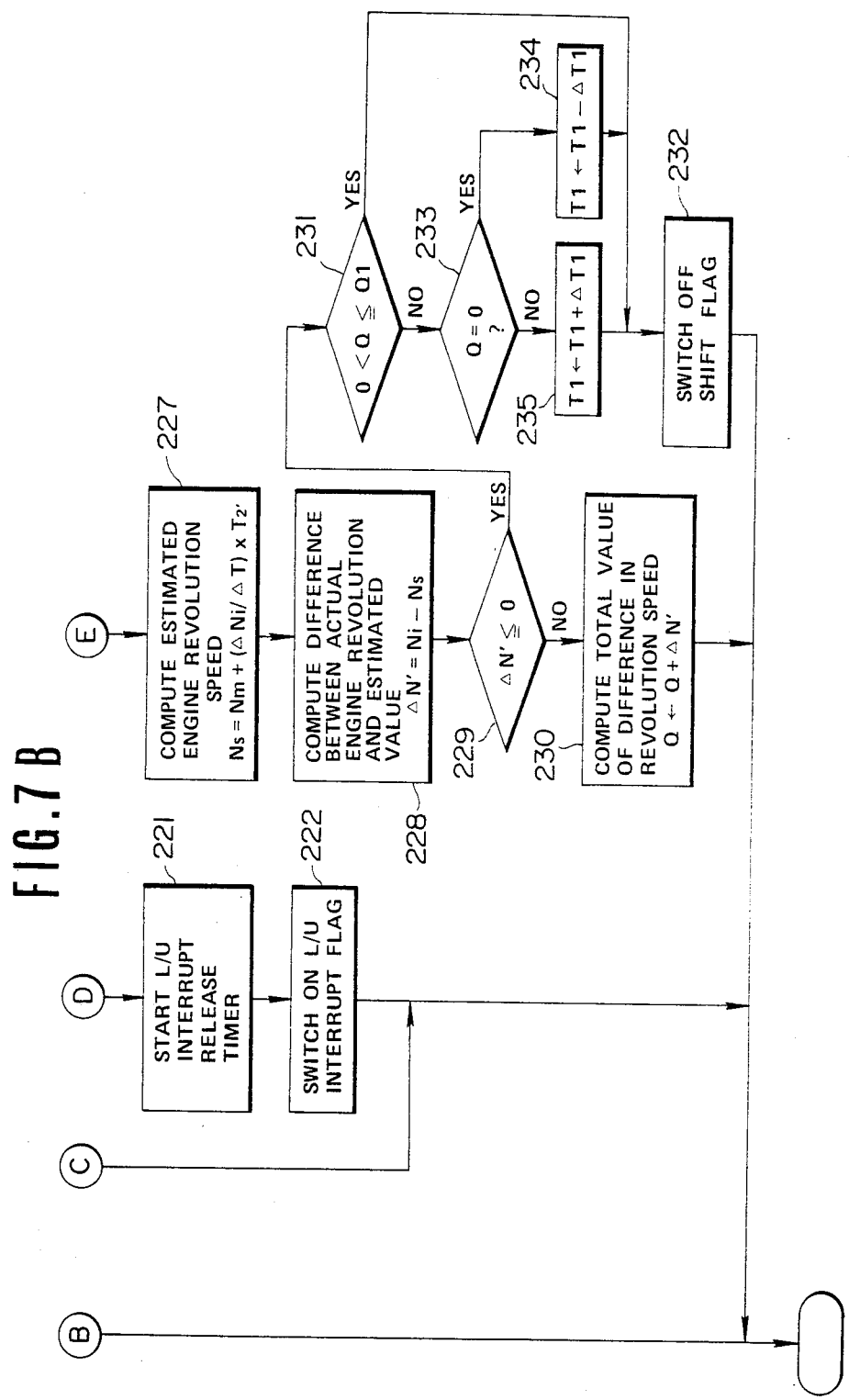

LOCK-UP CONTROL AND METHOD THEREOF

BACKGROUND OF THE INVENTION

The present invention relates generally to a lock-up type automatic transmission, and particularly to an improvement in a lock-up control whereby occurrence of substantial shift shocks is prevented.

Commonly, automatic transmissions have a torque converter in an engine power delivery path thereof in order to multiply torque from an engine. In the torque converter, an inlet element (a pump impeller) driven by an engine imparts a rotational force to a working hydraulic fluid within the torque converter, and the rotation of the fluid causes an output element (a turbine runner) to rotate under the reaction of a stator, thus multiplying an engine torque (this mode of operation being called as "a converter state"). Owing to this hydrodynamic transmission of power, the torque converter is subjected to a slip between the pump impeller and the turbine runner while it is in operation. Thus, the automatic transmissions having a torque converter in the engine power delivery path thereof is poor in fuel economy due to poor power transmission effeciency although they are easy to operate. In order to alleviate this drawback, there has been conventionally proposed a torque converter with a so-called bridge clutch (which may be called as a lock-up torque converter) wherein the turbine runner is directly and mechanically connected to the pump impeller (this mode of operation being called as "a lock-up state") in order to eliminate the slip at relatively high vehicle speed range where the engine is not subject to substantially torque variations. Recently, some automobiles have begun to use such an automatic transmission with a lock-up type torque converter.

Referring to FIG. 1, a shift pattern diagram illustrates lock-up ranges of an automatic transmission wherein the torque converter with the bridge clutch assumes the lock-up state when an actual vehicle speed is higher than a preset vehicle speed value (i.e., a lock-up vehicle speed) for each of forward speed or gears. In this Figure, there is illustrated a shift schedule for upshiftings to take place in a three-speed automatic transmission, where V1, V2 and V3 designate lock-up vehicle speeds for first, second and third speeds, respectively, and A, B and C designate lock-up ranges for the first, second and third speeds, respectively. In the case of automatic transmission where the torque converter locks up when the vehicle speed is higher than the lock-up vehicle speed as mentioned above, a shifting between two adjacent forward speeds with the accelerator pedal depressed deeply by a great degree (with a large throttle opening degree) takes place when the torque converter remains in the lock-up state thereof as will be readily understood from the fact that the lock-up ranges A, B and C are disposed one next to another along the vehicle speed at the large throttle opening degrees. If the shifting were made with the torque converter in the lock-up state therof, substantilly great shocks would take place because the torque variations upon shifting could not be absorbed.

In the lock-up type automatic transmission of this kind, the above mentioned problem has been tried to solved although not completely by releasing the lock-up action upon shifting even during operation in any one of the above mentioned lock-up ranges, thereby to temporarily render the torque converter to operate in the torque converter state thereof. It is therefore the common practice to construct a control arrangement wherein a shift detecting circuit is provided which generates a shift signal indicative of in-shifting state for a predetermined time after a command for shifting has been made and the lock-up action is interrupted temporarily while the shift signal from this circuit is present even during operation in any one of lock-range ranges.

Describing how the above mentioned shift detecting circuit works in shifting from the second speed to the third speed referring to FIG. 8(a), it generates a shift signal at the same instant t1 when a command for shifting takes place for releasing the lock-up (L/u) action for a predetermined time T'. According to this control strategy, the lock-up action is released too early, thus posing inconveniences as follows. There is a time lag from the instant when the command for shifting is made to the instant when the actual shifting operation initiates, viz., initiation of actuation of the friction elements, because of the existence of a response delay in the hydraulic control system of the transmission. Therefore, if the lock-up action is released simultaneously with the instant when the command for shifting is made, the lock-up action is released before the actual shifting operation begins, an engine revolution speed rises rapidly during a moment from t1 to t2 as shown in FIG. 8(a), causing the engine to race. Owing to the fact that releasing of the lock-up terminates so as to allow the lock-up action to resume at the instant during a moment from t3 to t4 when the shifting operation actually takes place, the torque converter cannot aborb shift shocks inherent with the shifting operation, and this fact cooperates with the fact that engine revolution speed has risen resulting from engine racing as mentioned, increases the magnitude of a peak torque at the instant t5 right after the shifting operation, with the inevitable result that substantial shift shocks occur. This tendency becomes marked when the automatic transmission is subject to an upshifting because the upshifting takes place with the power-on mode. This problem is more serious upon upshifting from the second speed to the third speed where a front clutch that is to be engaged for the third speed is engaged while releasing a second brake which is to be applied for the second speed, thus requiring a long so-called overlap time, causing the shifting operation for this upshifting to be delayed as compared to the other shifting operations.

As one measure to solve this problem, it is conceivable to elongate the lock-up interrupt time T' up to the instant when the shifting operation will be completed, but this leaves the racing problem of the engine unsolved. The increase in the engine revolution speed causes the corresponding increase in the magnitude of shift shocks.

For solving the above mentioned problem, U.S. Pat. No. 4,431,095 issued to Massaki Suga on Feb. 14, 1984 has disclosed a lock-up type automatic transmission wherein a delay circuit is provided so as to delay generation of a shift signal for a predetermined time T1 after the instant t1 when the command for shifting is made as shown in FIG. 8(b), whereby the interruption (OFF) of the lock-up (L/u), which is to take place upon shifting during operation in any one of the lock-up ranges, is rendered to coincide with the instant t3 when the actual shifting operation begins.

However, a delay time from the instant t1 to the instant t3, i.e., a delay from the instant when the command for shifting is made to the instant when the actual shifting operation initiates, varies from one manufacturing product to another due to manufacturing dispersion among products, i.e., a difference in flow resistance in shift control fluid passages and variation in viscosity of working fluid, and it has been confirmed that the predetermined time T1 set by the above mentioned delay circuit does not necessarily agree with the delay time from t1 to t3 with the result that with this conventional measure the above mentioned engine racing and substantial shift shocks cannot be prevented.

SUMMARY OF THE INVENTION

As will be recognized from comparison between FIG. 8(a) and FIG. 8(b), an integral value Q of a difference between an estimated engine revolution speed Ns and an actual engine revolution speed after an instant t1 when a command for shifting has been made varies with a deviation of a predetermined time T1 from an actual time elapsed from the instant t1 to an instant t3 when the actual shifting operation begins, and the integral value Q becomes small as the deviation decreases.

On the recognition of this fact, an object of the present invention is to provide a lock-up control whereby a delay time between an instant when a command for shifting takes place to an instant when engagement of a bridge clutch (lock-up clutch) is temporarily released is appropriately adjusted to an instant when the actual shifting operation begins, thereby to prevent engine racing and substantial shift shocks upon shifting when the bridge clutch is engaged.

According to one aspect of the present invention, there is provided a lock-up control system for a lock-up type automatic transmission for a vehicle having an engine, the automatic transmission including a lock-up type torque converter having an input element drivingly connected to the engine, an output element and a bridge clutch which, when engaged, mechanically interconnects the input element and the output element, said lock-up control system, comprising:

means for detecting a command for shifting in the automatic transmission and generating a shifting command indicative signal;

means responsive to said shifting command indicative signal for temporarily releasing engagement of the bridge clutch;

means for estimating an engine revolution speed after an instant when the bridge clutch is temporarily released and generating an estimated engine revolution speed indicative signal;

means for detecting an actual engine revolution speed and generating an actual engine revolution speed indicative signal;

means for integrating a difference between said estimated engine revolution speed indicative signal and said actual engine revolution speed indicative signal to give an integral value and generating an integral value indicative signal; and means for determining said instant in such a manner as to decrease a difference between said integral value and a predetermined value.

According to another aspect of the present invention, there is provided a method for controlling a lock-up in a lock-up type automatic transmission for a vehicle having an engine, the automatic transmission including a lock-up type torque converter having an input element drivingly connected to the engine, an output element and a bridge clutch which, when engaged, mechanically interconnects the input element and the output element, said lock-up control system, comprising the steps of:

detecting a command for shifting in the automatic transmission and generating a shifting command indicative signal;

temporarily releasing engagement of the bridge clutch responsive to said shifting command indicative signal;

estimating an engine revolution speed after an instant when the bridge clutch is temporarily released and generating an estimated engine revolution speed indicative signal;

detecting an actual engine revolution speed and generating an actual engine revolution speed indicative signal;

integrating a difference between said estimated engine revolution speed indicative signal and said actual engine revolution speed indicative signal to give an integral value and generating an integral value indicative signal; and determining said instant in such a manner as to decrease a difference between said integral value and a predetermined value.

BRIEF DESCRIPTION OF THE DRAWINGS

FIGS. 3A and 3B, when combined, provide a schematic view of a hydraulic control system of the lock-up type automatic transmission;

FIGS. 7A and 7B, when combined, provide a flowchart showing a control program stored in the microcomputer shown in FIG. 5;

DESCRIPTION OF THE EMBODIMENT

The present invention is specifically explained hereinafter in connection with the illustrated embodiment.

Figure 2:
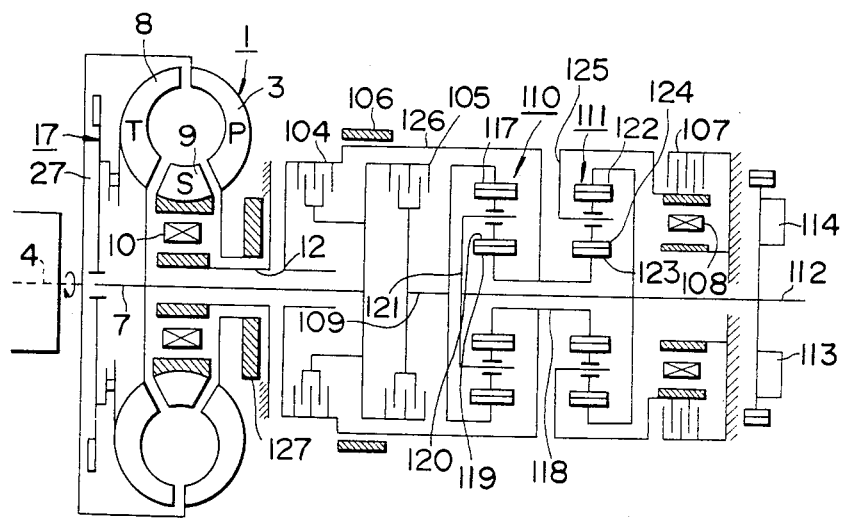
FIG. 2 is a schematic view of a power transmitting part of the lock-up type automatic transmission.

FIG. 2 shows in schematic a power transmitting part within a 3-forward speed, 1-reverse speed lock-up type automatic transmission. It comprises a crankshaft 4 to be driven by a prime mover, an engine, a torque converter 1 having a lock-up mechanism 17 which will be described later, an input shaft 7, a front clutch 104, a rear clutch 105, a second brake 106, a low reverse brake 107, a one-way brake 108, an intermediate shaft 109, a first planetary gear unit 110, a second planetary gear unit 111, an output shaft 112, a first governor valve 113, a second governor valve 114, and an oil pump 13. The torque converter 1 comprises a pump impeller 3, a turbine runner 8, and a stator 9. The pump impeller 3 is driven by the crankshaft 4 to rotate working oil therein so as to transmit a torque to the turbine runner 8 fixed to the input shaft 7. This torque is transmitted by the input shaft 7 to a change-speed gear train. The stator 9 is disposed on a sleeve 12 via a one-way clutch 10. The one-way clutch 10 allows the stator 9 to rotate in the same direction as the crankshaft 4, that is, in the direction indicated by an arrow in FIG. 2 (this rotation is referred to as forward rotation hereinafter), but prevents it from rotating in the reverse direction (this rotation is referred to as reverse rotation hereinafter). The first planetary gear unit 110 comprises an internally toothed gear 117 fixed to the intermediate shaft 109, a sun gear 119 fixed to a hollow transmitting shaft 118, and at least two planetary pinions 120 meshing with the internally toothed gear 117 and sun gear 119, which pinions 120 are capable of orbiting around the sun gear 119 while revolving about their axes, and a planetary pinion carrier 121 supporting the planetary pinions 120 which carrier 121 is fixed to an output shaft 112. The second planetary gear unit 111 comprises an internally toothed gear 122 fixed to the output shaft 112, a sun gear 123 fixed to the hollow transmitting shaft 118, and at least two planetary pinions 124 meshing with the internally toothed gear 122 and sun gear 123, which pinions 124 are capable of orbiting around the sun gear 123 while revolving about their axes, and a planetary pinion carrier 125 for supporting the planetary pinions 124. The front clutch 104 is operative to connect the input shaft 7, driven by the turbine runner 8, to the hollow transmitting shaft 118, which is integrally rotatable with both sun gears 119 and 123, via a drum 126, whereas the rear clutch 105 is operative to connect the input shaft 7 to the internally toothed gear 117 of the first planetary gear unit 110 via the intermediate shaft 109. The second brake 106 is operative to anchor both sun gears 119 and 123 by gripping the drum 126 fixed to the hollow transmitting shaft 118, whereas the low reverse brake 107 is operative to anchor the pinion carrier 125 of the second planetary gear unit 111. The one-way brake 108 allows forward rotation of the pinion carrier 125, but prevents reverse rotation thereof. The first and second governor valves 113 and 114 are operatively connected to the output shaft 112 and produce a governor pressure in response to the vehicle speed.

Now, power delivery paths to be established during operation when a manual speed selector lever is set to a D position (forward drive range) will be explained.

In this case, only the rear clutch 105 which serves as a forward input clutch is engaged. A torque delivered from an engine via the torque converter 1 is transmitted via the input shaft 7 and rear clutch 105 to the internally toothed gear 117 of the first planetary gear unit 110. The internally toothed gear 117 causes the planetary pinions 120 to rotate in the forward direction. This causes the sun gear 119 to rotate in the reverse direction, and, since the sun gear 123 of the second planetary gear unit 111 which is rotatable with the sun gear 119 rotates in the reverse direction, the planetary pinions 124 of the second planetary gear unit 111 rotates in the forward direction. The one-way brake 108 acts as a forward reaction brake to prevent the sun gear 123 from rotating the pinion carrier 125 in the reverse direction, thus causing the internally toothed gear 122 of the second planetary gear unit 111 to rotate in the forward direction. Accordingly, the output shaft 112 which is rotatable with the internally toothed gear 122 rotates in the forward direction at a reduction ratio for the first forward speed. When, in this state, the vehicle speed increases and the second brake 106 is applied, the power from the input shaft 7 and past rear clutch 105 is transmitted to the internally toothed gear 117 is the same as in the counterpart for the first forward speed. The second brake 106 acts as a forward reaction brake to anchor the drum 126, thus preventing the rotation of the sun gear 119. This causes the planetary pinions 120 to rotate about their axes and orbit around the anchored sun gear 119, and accordingly the pinion carrier 121 and output shaft 112, which is rotatable with the pinion carrier 121, rotate in the forward direction at a speed which is faster than the speed of the output shaft 112 at the first speed although it is reduced as compared to the input shaftspeed, thus establishing a reduction ratio for the second forward speed.

As the vehicle speed further increases and when the second brake 106 is released and, in lieu thereof, the front clutch 104 is engaged, a portion of the power transmitted to the input shaft 7 is transmitted through the rear clutch 105 to the internally toothed gear 117, while the balance is transmitted through the front clutch 104 to the sun gear 119. Thus, the internally toothed gear 117 and sun gear 119 are interlocked and rotate in the forward direction, as a unit, together with both the pinion carrier 121 and output shaft 112 at the same speed, thus establishing the third forward speed. In this case, the front clutch 104 and rear clutch 105 serve as an input clutch and the torque mutiplication is not carried out in the planetary gears, so that none acts as a reaction brake.

Now, a power delivery path when the speed selector lever is set to R position (reverse drive) is explained.

In this case, the front clutch 104 and low reverse brake 107 are applied, the power from the engine and past through the torque converter 1 is delivered from the the input shaft 7 to the sun gears 119 and 123 via the front clutch 104 and drum 126. The rear pinion carrier 125 is held stationary by the low reverse brake 107, so that the above mentioned forward rotation of the sun gears 119 and 123 causes the internal gear 112 to rotate at a reduced speed in the reverse direction and a reduction ratio for the reverse drive is given by the output shaft 112 which is rotatable with the internally foothed gear 122.

Figure 3A:
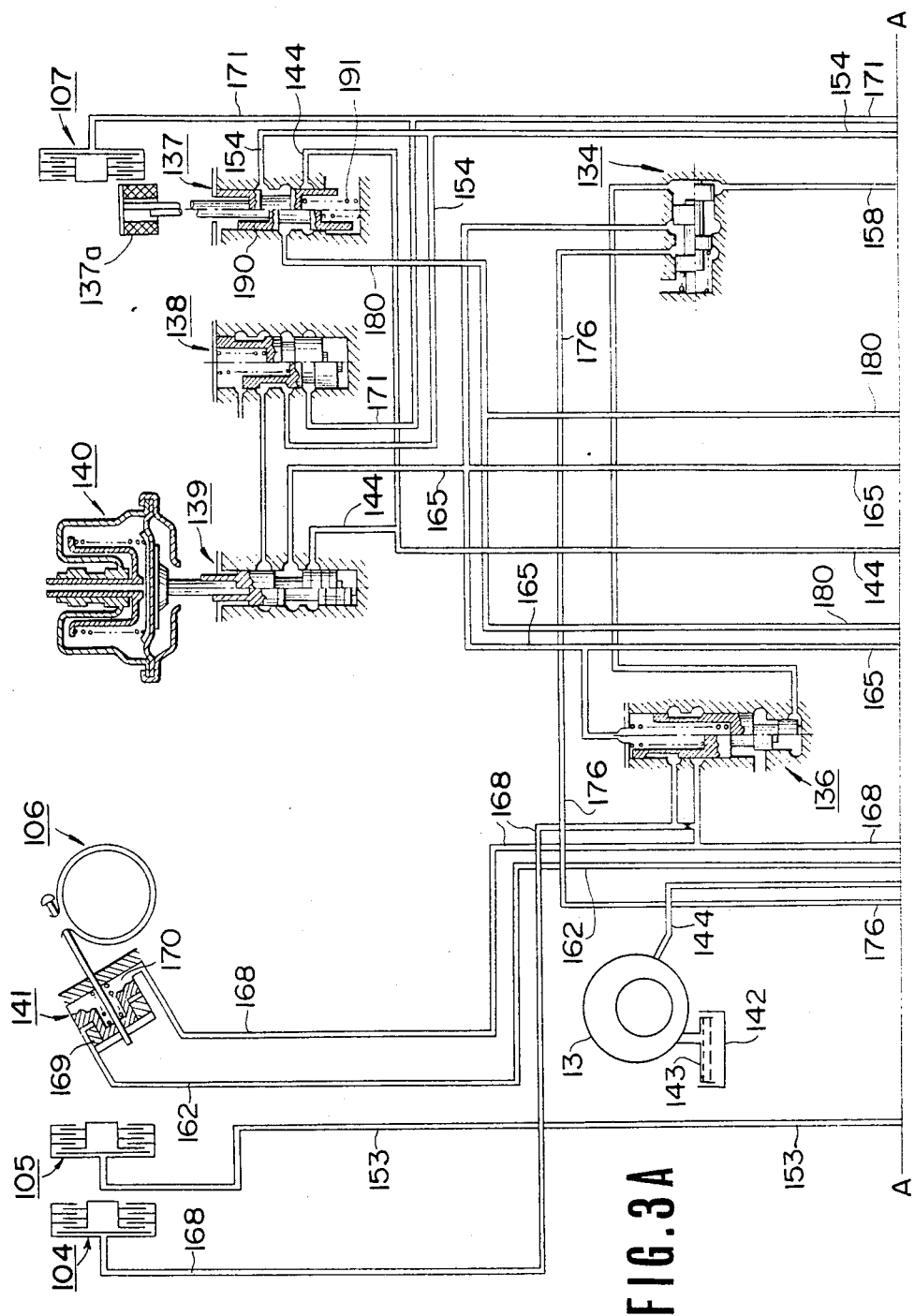

FIGS. 3A and 3B show a hydraulic control system of a shift control unit for the above-described change speed transmission, which control system comprises an oil pump 13, a line pressure regulator valve 128, a pressure booster valve 129, a torque converter 1, a speed selector valve 130, a first governor valve 113, a second governor valve 114, a 1-2 shift valve 131, a 2-3 shift valve 132, a throttle pressure reducing valve 133, a cut-down valve 134, a second lock valve 135, a 2-3 timing valve 136, a solenoid down shift valve 137, a throttle back-up valve 138, a vacuum throttle valve 139, a vacuum diaphragm 140, a front clutch 104, a rear clutch 105, a second brake 106, a servo 141, a low-reverse brake 107, a hydraulic pressure network. The hydraulic fluid or oil pump 13 is driven by a prime mover via the driving shaft 4 and the pump impeller 3 of the torque converter 1 and draws hydraulic fluid from a reservoir 142 through a strainer 143, where harmful dust is removed, during all operating conditions of the prime mover so as to deliver the oil to a line pressure circuit 144.

The hydraulic fluid is regulated by the line pressure regulator valve 128 and the thus regulated hydraulic fluid is delivered to the torque converter 1 and the speed selector valve 130. The line pressure regulator valve 128 comprises a spool 172 and a spring 173, in which, in addition to a bias by the spring 173, the throttle pressure in a circuit 165 and the line pressure in a circuit 156 act on the spool 172 via a spool 174 of the pressure booster valve 129 and these forces are applied to the spool 172 against the line pressure applied from a circuit 144 via an orifice 175 and the pressure from a circuit 176 both acting on upper areas of the spool 172. The hydraulic pressure in the torque converter is maintained within a certain pressure range by a pressure maintaining valve 146 as long as the oil having admitted to a corcuit 146 is discharged via a discharge passage 51 and the pressure maintaining valve 146 after passage through the torque converter 1 from a feed passage 50. When the pressure exceeds a certain level, the pressure maintaining valve 146 opens to permit the hydraulic fluid to flow into a circuit 147 toward the rear lubricating section of the power transmitting mechanism. When this lubricant pressure is too high, a relief valve 148 opens to bring down a pressure. On the other hand, the lubricant from the circuit 145 is supplied via a front lubrication valve 149 to the front lubricating section of the power transmitting mechanism. The speed selector valve 130 is a manually operable liquid direction switching valve and it comprises a spool 150, and is connected to a speed selector lever (not shown) through a linkage so that manipulating the speed selector lever into any desired one of the positions causes the spool 150 to change the passage of the line pressure circuit 144. FIGS. 3A and 3B show a state of the speed selector valve when the spool assumes N (neutral) position, wherein the line pressure circuit 144 is permitted to communicate with the two ports d and e. The first and second governor valves 113 and 114 produce a governor pressure while the automobile travels in the forward direction and causes the governor pressure to actuate the 1-2 shift valve 131 and the 2-3 shift valve 132 for effecting an automatic shifting and also to affect the line pressure. When the speed selector valve 130 assumes either D, II or I position, the hydraulic pressure is fed from the line pressure circuit 144 to the second governor valve 114 through the port c of the speed selector valve 130. If, under this condition, the automobile begins to move, the governor pressure regulated by the second governor valve 114 is delivered to a circuit 157 leading to the first governor valve 113, and subsequently when the vehicle speed reaches a predetermined value, the spool 177 of the first governor valve 113 moves to a position wherein the circuit 157 communicates with a circuit 158, admitting the governor pressure thereto. From the circuit 158, the governor pressure acts on the respective end surfaces of the 1-2 shift valve 131, 2-3 shift valve and cut-down valve 134 against the respective springs which urge these valves to the right as viewed in the Figure so as to balance with the corresponding spring forces.

In a hydraulic pressure circuit leading from the port c of the speed selector valve 130 through a circuit 153, a circuit 161 and a circuit 162, up to an apply side hydraulic pressure chamber 169 of a servo 141 for gripping the second brake 106, the 1-2 shift valve 131 and second lock valve 135 are separately arranges, and a circuit 152 leads from the port b of the speed selector valve 130 to the second lock-up valve 135.

If the speed selector lever 130 is set to D position, the spool 150 of the speed selector valve 130 is moved to a position providing communication between the line pressure circuit 144 and ports a, b and c. From the port a, the hydraulic fluid pressure passes through the circuit 151 to the second lock valve 135 to act on the lower end thereof, thereby to prevent the interruption of the communication between the circuits 161 and 162 which are permitted to communicate with each other when the spool 178 which is urged upward by a spring 179 is pressed down by the oil pressure acting thereon via the circuit 152 from the port b. The hydraulic pressure at the port a is delivered via an orifice 166 and a circuit 167 also to the 2-3 shift valve 132. The hydraulic pressure at the port c is transmitted through a circuit 153 to the second governor valve 114, rear clutch 105, and 1-2 shift valve 131, thereby to establish the first forward speed. If, under this condition, the vehicle speed increases up to a certain value, the governor pressure in the circuit 158 urges the spool 160 to the 1-2 shift valve 131, which is urged to the right by the spring 159, to move to the left, thereby to effect an upshift from the first forward speed to the second forward speed, where the circuit 153 is permitted to communicate with the circuit 161, allowing hydraulic pressure to be delivered through the second lock valve 135 and circuit 162 to the apply side hydraulic pressure chamber 169 of the servo 141 to apply the second brake 106, thus establishing the second forward speed.

In this case, since the 1-2 shift valve 131 is small-sized, it is assumed that the spool 160 moves to the left quickly before the vehicle speed rises further beyond the vehicle speed value at which a shifting from the first to second speed is to take place. If the vehicle speed further increases up to another certain value, the governor pressure in the circuit 158 urges the spool 164 of the 2-3 shift valve 132 to the left overcoming the spring 163, so that the circuit 167 is permitted to communicate with the circuit 168 delivering hydraulic pressure via the circuit 168 to the release-side hydraulic pressure chamber 170 of the servo 141 so as to release the second brake 106 and also to the front clutch 104 to engage same, thus establishing the third forward speed.

If a driver depresses an accelerator pedal deeply till the full throttle opening position during running with D position so as to demand a large acceleration as desired, a kickdown switch is switched ON and a downshift solenoid 137a of the solenoid downshift valve 137 is energized because electric current passes therethrough. The energization of the solenoid 137a causes a spool 190 of the solenoid downshift valve 137 to move from a spring set position by a spring 191 downward. In this now position, a kickdown circuit 180 is allowed to communicate with the line pressure circuit 144, thus admitting the line pressure to the 1-2 shift valve 131 and the 2-3 shift valve 132 via the circuit 144 and the circuit 180, urging these valves against the governor pressure. Assuming now that the vehicle is traveling with the third speed when the solenoid 137a is energized, a spool 164 of the 2-3 shift valve is forcibly pushed to move from the leftward position to the rightward position against the governor pressure owing to the line pressure, effecting a forced downshift from the third speed to the second speed as long as the vehicle speed is lower than an upper limit value, thus providing a sufficiently large acceleration. Assuming that the vehicle is traveling with the second speed when the above mentioned kickdown is carried out, the line pressure admitted to the kickdown circuit 180 can push a spool 160 of the 1-2 shift valve 131 also from the leftward position to the right against the governor pressure because in this travelling condition, a heavy load is applied and vehicle speed is low. Therefore, a forced downshift from the second speed to the first speed takes place, providing a larger acceleration matching with the heavy load.

If the speed selector lever is set to the II position (manual second speed), the spool 150 of the speed selector valve 130 is moved to a position providing communication between the line pressure circuit 144 and the ports b, c and d. The hydraulic pressure at the port b is fed to the same place as in the case of D and the hydraulic pressure at the port c is fed to the rear clutch 105 to engage same. Because, under this condition, the hydraulic pressure does not act on the lower end of the second lock valve 135 and because the lower land has a larger area than the upper land, which lands form a space on the spool 178 opening to the circuit 152, the spool 178 of the second lock valve 135 is pushed downward against the force of the spring 178, assuming a position in which the circuit 152 is permitted to communicate with the circuit 162, permitting the hydraulic pressure to reach the apply side hydraulic pressure chamber 169 of the servo 141 so as to effect application of the second brake 106, thereby establishing the second forward speed. The hydraulic pressure at the port d is delivered via the circuit 154 to the solenoid down shift valve 137 and also to the throttle back-up valve 138. Since the communication between the line pressure circuit 144 leading to the speed selector valve 130 and the port a thereof is prevented, the hydraulic pressure does not pass through the circuit 151 to the 2-3 shift valve 132, thus neither release of the second brake 106 nor the application of the front clutch 104 will take place, so that an upshift to the third forward speed is prevented. As explained, the second lock valve 135 cooperates with the speed selector valve 130 to lock the transmission in the second forward speed. If the speed selector lever is set to I position (manual first forward speed), the line pressure circuit 144 is permitted to communicate with the ports c, d and e. The hydraulic pressure at the port c is delivered to the rear clutch 105 to effect clutch engagement and the hydraulic pressure at the port d is delivered to the same places as in the case of II, whereas the hydraulic pressure at the port e is delivered via the circuit 155, 1-2 shift valve 131 and the circuit 171 to the low-reverse brake 107 so as to apply the low reverse brake 107 which, when applied, acts as a forward reaction brake, thus conditioning the transmission in the first forward speed. The hydraulic pressure at the port e is delivered also to the left end of the 1-2 shift valve 131, pushing the spool 160 to the right in cooperation with the spring 159, thus locking the transmission in the first forward speed.

Figure 4A:
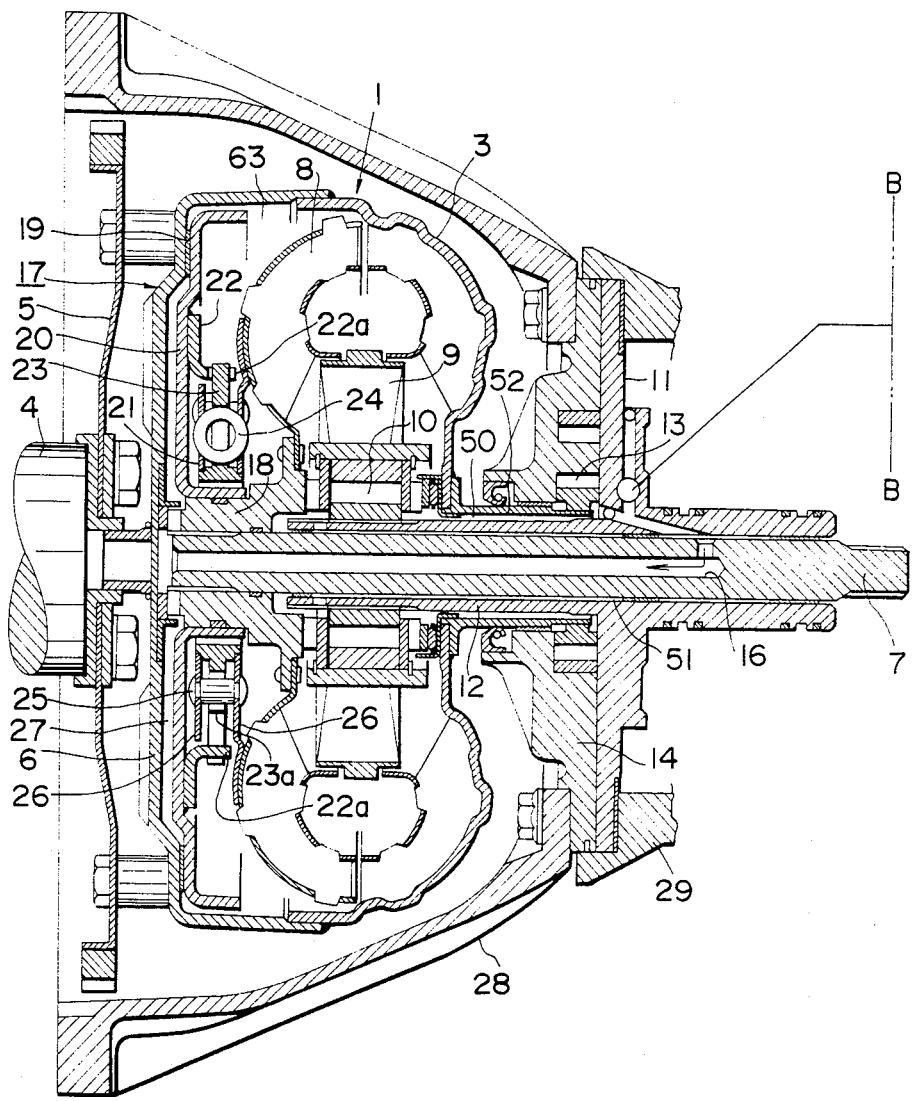
FIGS. 4A and 4B, when combined, provide a schematic sectional view showing a torque converter with a bridge (lock-up) clutch, lock-up control valve and solenoid valve shown in FIG. 3B.
Figure 4B:
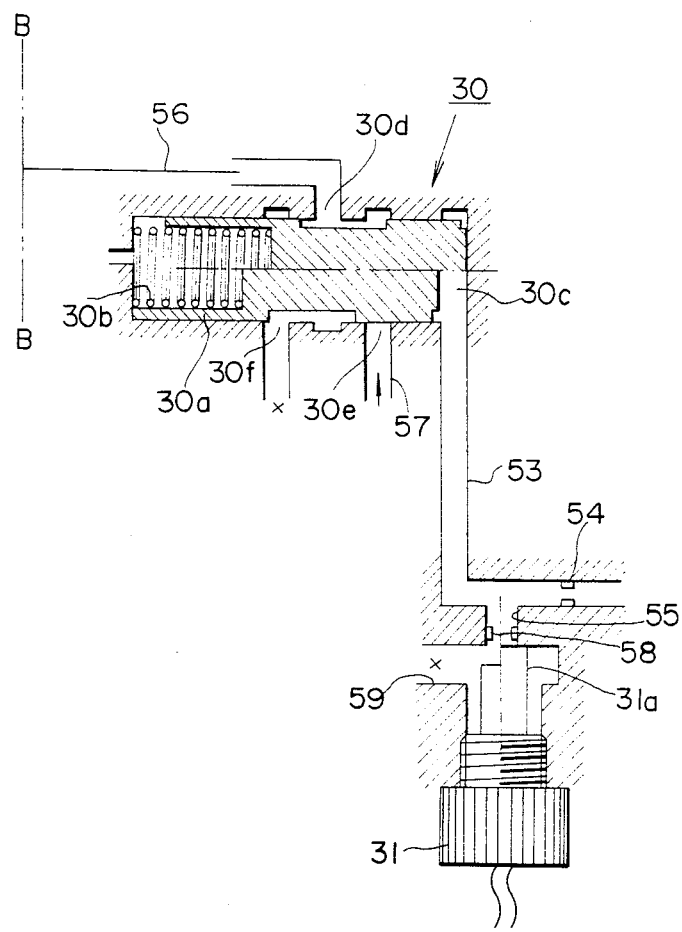

In FIG. 3B, the reference numeral 100 denotes a lock-up control system according to the present invention which control system comprises a lock-up control valve 30 and a lock-up solenoid 31. Referring to FIGS. 4A and 4B, the lock-up control valve 30, lock-up solenoid 31 and torque converter 1 with a lock-up mechanism 17 are specifically explained hereinafter.

The pump impeller 3 of the torque converter 1 is connected via a converter cover 6 to a drive plate 5, which drive plate is connected to the engine crankshaft 4. The turbine runner 8 is splined to an input shaft 7 via a hub 18, and further the stator 9 is connected to the sleeve 12 via the one-way clutch 10. The torque converter 1 is enclosed by a converter housing 28 which is connected together with a pump housing 14 and a pump cover 11 to a transmission case 29. The pump housing 14 and pump cover 11 cooperate to define a chamber within which said oil pump 13 is received, which pump is connected to the pump impeller 3 through a hollow shaft 52 driven by the engine. The hollow shaft 52 jackets therein the sleeve 12 to define an annular hydraulic fluid feed passage 50 for the torque converter working pressure and the sleeve 12 allows the input shaft 7 to extend therethrough and cooperate to define therebetween a hydraulic fluid discharge passage 51 for the working pressure. The sleeve 12 is formed integrally with the pump cover 11.

The lock-up mechanism 17 has the following structure. A lock-up clutch piston (a direct clutch) 20 is fit around the hub 18 in an axially slidable manner, and this lock-up clutch piston is disposed within the converter cover 6. The lock-up clutch piston 20 has an annular clutch facing 19 fixed to a surface thereof positioned opposite to the end wall of the converter cover 6, thereby to provide an arrangement wherein when this clutch facing contacts with the end wall of the converter cover 6, a lock-up clutch chamber 27 and a torque converter chamber 63 are defined on the opposite sides of the lock-up clutch piston 20.

The lock-up clutch piston 20 is drivingly connected to the turbine runner 8 via a torsional damper 21. The torsional damper 21 is of the same type as that used in a dry-type clutch and the like and comprises a drive plate 23, torsional springs 24, rivets 25 and driven plates 26. An annular member 22 is welded to the lock-up clutch piston 20 and has its claws 22a drivingly engaging in cutouts 23a formed through the drive plate 23, and the driven plate 26 is attached to the turbine runner 8. The lock-up chamber 27 communicates with a lock-up passage 16 formed through the input shaft 7, which lock-up passage is operatively associated with said lock-up control system 100.

The lock-up control valve 30 is provided with a spool 30a which when it assumes an upper half position as illustrated in FIG. 4B, owing to a spring 30b, permits a port 30d to communicate with a port 30e and, when it assumes a lower half position as illustrated in FIG. 4B owing to hydraulic pressure, permits the port 30d to communicate with a drain port 30f. The port 30d communicates via a passage 56 with a lock-up passage 16, the port 30e communicates via a branch passage 57 with the torque converter working hydraulic fluid feed passage 50 as shown in FIGS. 3A and 3B, and the chamber 30c communicates through a passage 53 with the rear clutch pressure passage 153 as shown in FIGS. 3A and 3B.

An orifice 54 is provided in the passage 53 at an intermediate portion thereof, and the passage 53 has a passage 55 branching from a location between this orifice and the chamber 30c. The branch passage 55 has therein an orifice 58 and communicates with a drain port 59 and is associated with the lock-up solenoid 31 adapted to open and close the branch passage 55. For this purpose, the lock-up solenoid 31 has a plunger 31a which normally assumes a left half position as illustrated in FIG. 3B or FIG. 4B, but when the solenoid 31 is energized, projects to assume a right half position as illustrated to close the branch passage 55.

When the solenoid 31 is not energized, allowing the plunger 31a to open the branch passage 55, this branch passage communicates with the drain port 59. Then, the rear clutch pressure in the passage 53 and directed toward the chamber 30c is discharged through the drain port 59, thus allowing the lock-up control valve 30 to communicate the port 30d with the port 30e because the spool 30a is urged by the spring 30b and assumes the upper half position as illustrated in FIG. 4B. Therefore, a torque converter pressure admitted to the passage 57 is delivered via the ports 30e, 30d, passage 56, passage 16 to the lock-up chamber 27, thus developing the same pressure within the lock-up chamber 27 as that within the converter chamber 63. This causes the lock-up clutch piston 20 to move rightward from the position as illustrated in FIG. 4A to disengage its clutch facing 19 from the end wall of the converter cover 6, thus releasing the direct connection between the pump impeller 3 and the turbine runner 8, allowing the torque converter 1 to transmit the power in the torque converter state.

When the lock-up solenoid 31 is energized to cause the plunger 31a to close the branch passage 55, the rear clutch pressure is supplied through the passage 53 to the chamber 30c, allowing the lock-up control valve 30 to communicate the port 30d with the drain port 30f because the spool 30a is moved leftward from the illustrated upper half position to the illustrated lower half position as viewed in FIG. 4B. This causes the lock-up chamber 27 to communicate through the lock-up passage 16, passage 56, port 30d to a drain port 30f, causing the pressure therein to zero. Then, the lock-up clutch piston 20 is moved leftward as viewed in FIG. 4A by means of the torque converter pressure to be pressed into contact with the end wall of the converter cover 6, thus establishing a lock-up state wherein the pump impeller 3 is connected directly to the turbine runner 8.

Figure 5:
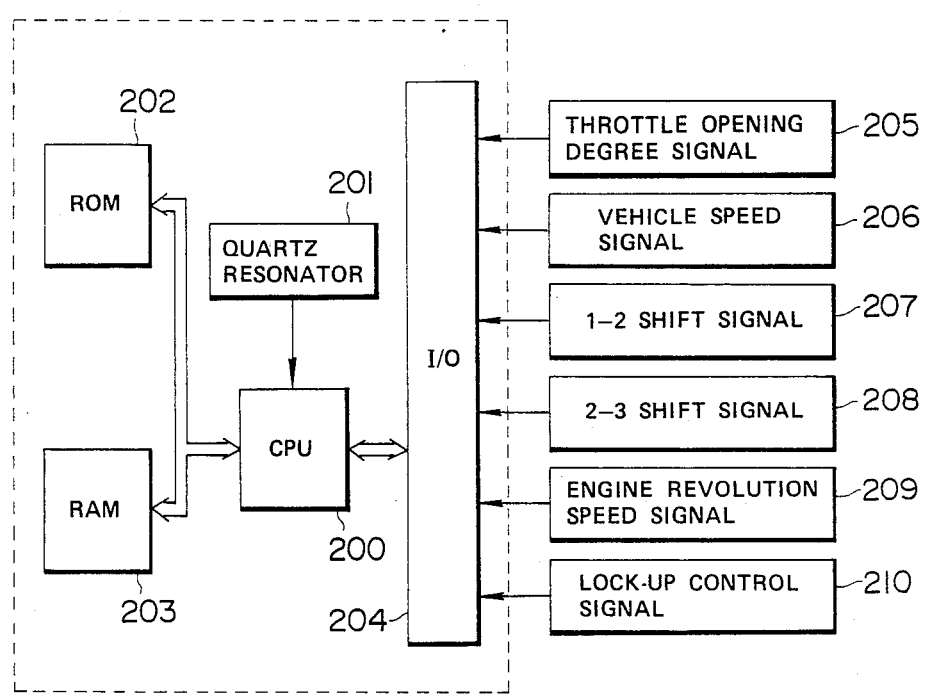
FIG. 5 is a block diagram showing a control arrangement, including a microcomputer, for performing a lock-up control for the lock-up type automatic transmission.

According to the present invention, ON-OFF of the above-mentioned lock-up solenoid 31 is controlled for example by a microcomputer as shown in FIG. 5. In this Figure, the reference numeral 200 designates a central processor unit (CPU), 201 a quartz resonator, 202 a read only memory (ROM), 203 a random acess memory (RAM), and 204 an input output interface (I/O), which cooperate with each other to form a microcomputer. The CPU 200 is adapted to read in a throttle opening degree signal 205, a vehicle speed signal 206, a 1-2 shift signal 207, a 2-3 shift signal 208, and an engine revolution speed signal 209 via the I/O 204, and then outputs a result of arithmetic operation using these input signals to the lock-up solenoid 32 (see FIGS. 3 and 4) in terms of a lock-up control signal 210, whereby the lock-up solenoid 31 is selectively switched ON or OFF so as to control the lock-up action of the torque converter 1.

Figure 6:
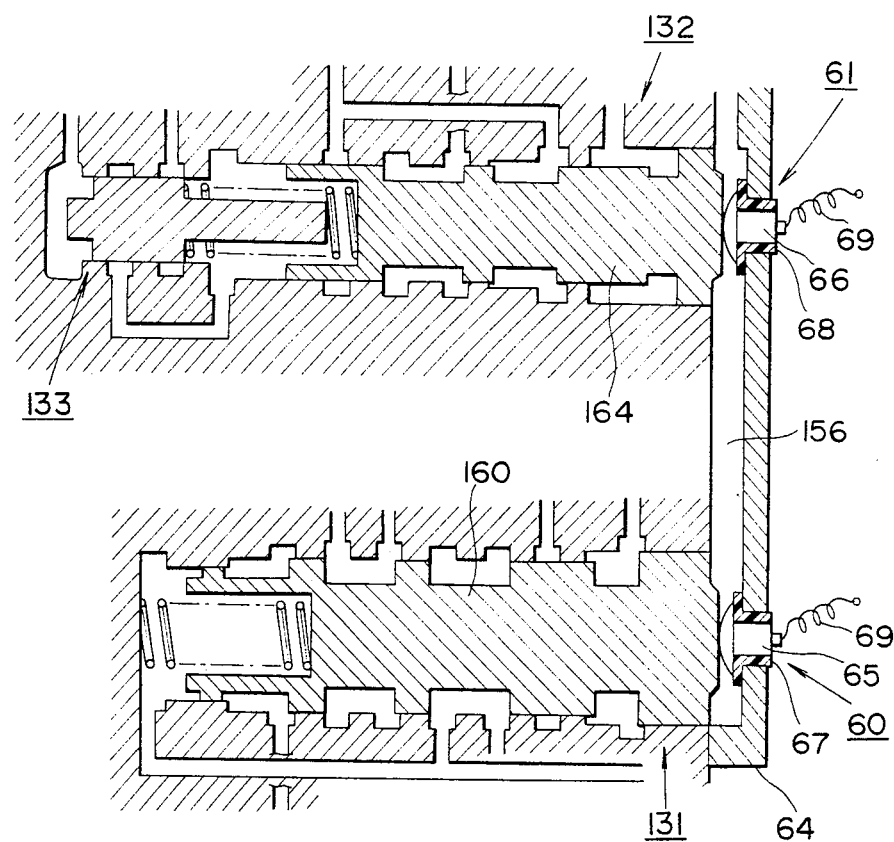
FIG. 6 is a schematic sectional view of the 1–2 shift and 2–3 shift valves illustrated in FIG. 3B showing the structures of shift switches used in the control arrangement shown in FIG. 5.

The 1-2 shift signal and 2-3 shift signal are given by a 1-2 shift switch 60 and a 2-3 shift switch 61 which are built in previously described 1-2 shift valve 131 and 2-3 shift valve 132, respectively, as shown in FIG. 6. These switches 60, 61 are switched ON or OFF in response to positions of valve spools 160, 164, respectively, and generate the signals 207, 208. In order to accomplish this purpose, stationary contacts 65, 66 are mounted via insulators 67, 68 to a side plate 64 in such a manner that they are disposed in face-to-face relationship with ends of the valve spools 160, 164, respectively, whereas the valve spools 160, 164 are used to serve as movable contacts. The shift valves 131, 132 are grounded to a vehicle body so that the stationary contact 65 and the valve spool 160 cooperate with each other to form the 1-2 shift switch and the starionary contact 66 and the valve spool 164 cooperate with each other to form the 2-3 shift switch 61 only by connecting via resistor the starionary contacts 65, 66 to a source of electricity + V.

Considering the previous description, it will now be noted that the 1-2 shift switch 30 and 2-3 shift switch 61 generate low (L) level signals (207, 208), respectively, when the first speed is established because the valve spools 160, 164 assume the positions as illustrated in FIG. 6 where they contact with the corresponding starionary contacts 65, 66. When the second speed is established, the valve spool 160 alone assumes a position after having moved leftward as viewed in FIG. 6 disengaging from the stationary contact 65, and as a result the 1-2 shift switch 60 generates a high (H) level signal 207. When the third speed is established, the other valve spool 164 assumes a position after having moved leftward as viewed in FIG. 6 disengaging from the stationary contact 66 and as a result the 2-3 shift switch 61 generates a H level signal 208 also.

The CPU 200 receives a clock signal from the quartz resonator 201 and executes a program stored in the ROM 202 once after elapse of a predetermined time, for example 100 ms, and temporarily store necessary data in the RAM 203 or reads out the data therefrom during execution of the program.

Figure 1:
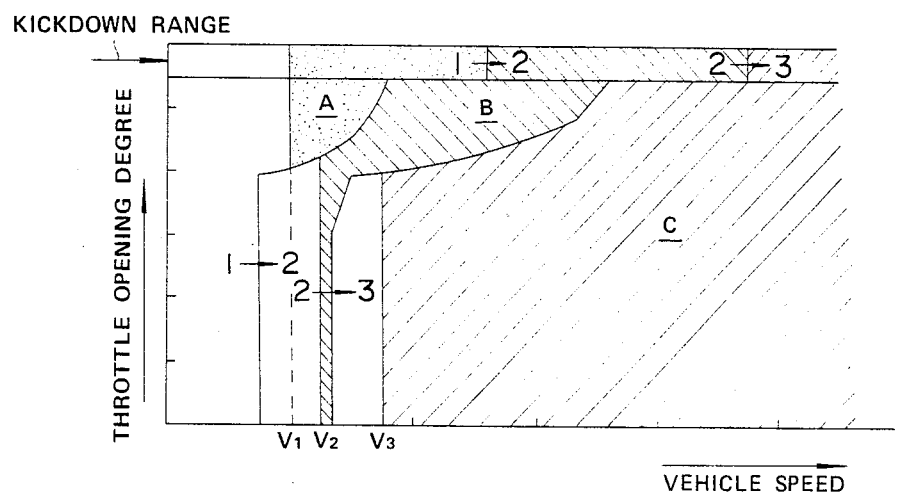
FIG. 1 is a shift pattern diagram showing an upshifting schedule for a lock-up type automatic transmission to which the present invention is applied.

In executing a control program not shown, the CPU 200 performs a determination based on a table as illustrated in a graph in FIG. 1 as to whether a vehicle travelling condition as represented by a throttle opening degree and a vehicle speed which are obtained from the signals 205, 206 and a speed position obtained from various combinations of levels of signals 206, 207 falls in any one of the lock-up ranges A, B and C where the torque converter 1 is to lock up or falls outside of these ranges, and then causes the lock-up control signal 210 to assume a H level when it falls in any one of the lock-up ranges so as to put the torque converter 1 into the lock-up state in terms of energizing the lock-up solenoid 31, or causes the lock-up control signal 210 to take the L level when it falls outside of the lock-up ranges so as to render the torque converter 1 in the torque converter state in terms of deenergizing the lock-up solenoid 31.

Figure 7A:
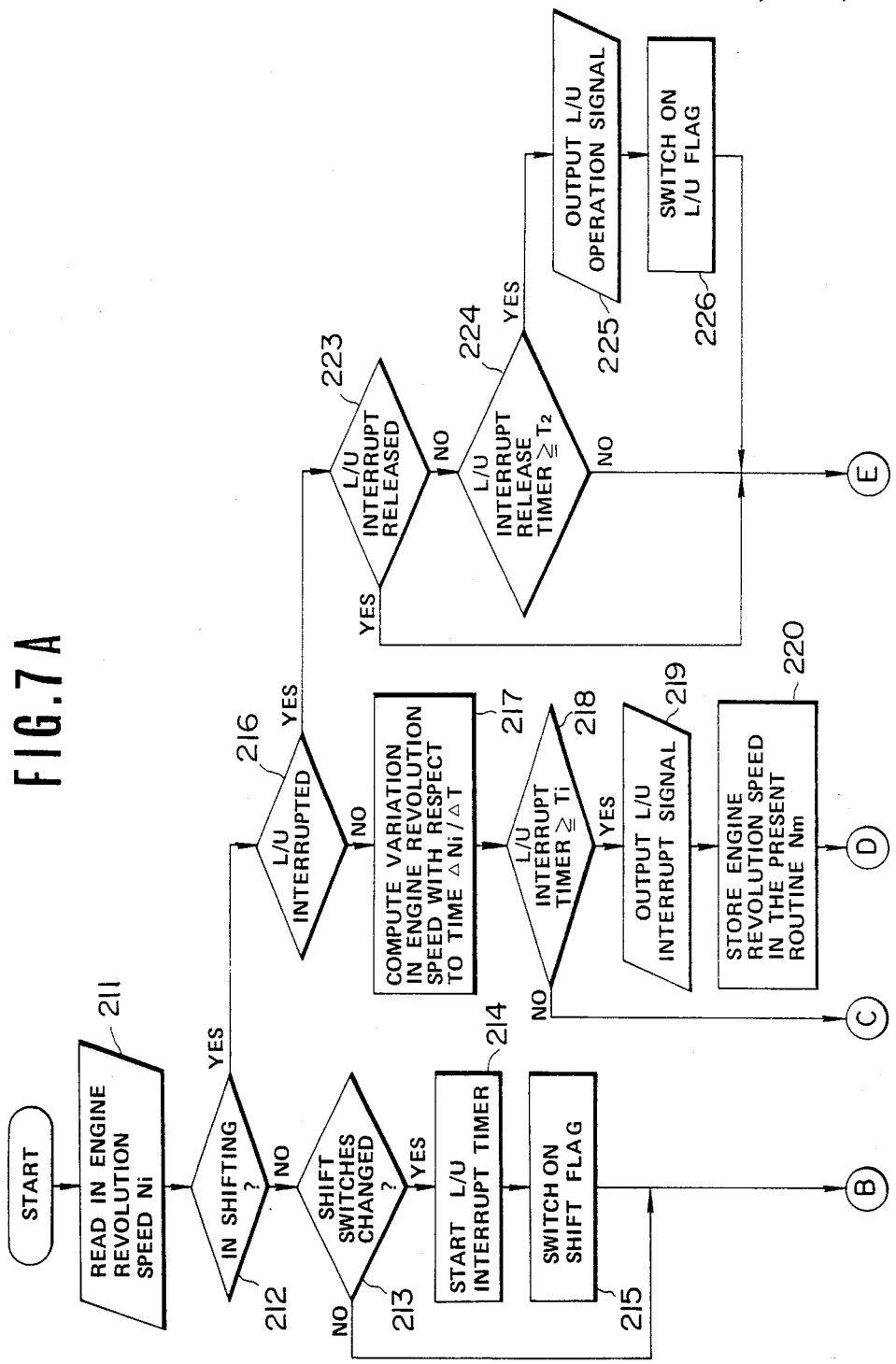

The description of the above paragraph relates to the basic lock-up control strategy as represented by the graph shown in FIG. 1. More particularly, the CPU 200 executes a control program as shown in FIGS. 7A and 7B in shifting from one to another speed during running in one of the lock-up ranges so as to interrupt the lock-up.

Referring a flowchart shown in FIGS. 7A and 7B, after having read in engine revolution speed Ni from the signal 209 in step 211, the CPU 200 determines whether the automatic transmission is subject to shifting or not in terms of whether a shift flag, which will be later described, is ON or OFF. If the shift flag is OFF indicating that the shifting is not carried out, the control proceeds to a step 213 where a decision is made whether the shift switches 61, 62 have changed or not by seeing whether any variation in signal level in the shift signals 207, 208 has occurred or not. If any variation has take place indicating that a shifting has begun (a shifting command has been issued), a lock-up interrupt timer is started in step 214, whereas if no variation has taken place indicating no occurrence of shifting command, the execution of the program ends. As will be understood from the above description, the lock-up interrupt timer functions to measure elasped time from the instant $t_1$ when the shifting command took place (see FIG. 8(b)). After starting the timer, the shift flag is switched ON in step 215 indicating that the transmission is subject to shifting and then the execution of the program ends. With this shift flag, the decision making in the above mentioned step 212 is carried out.

Figure 8:
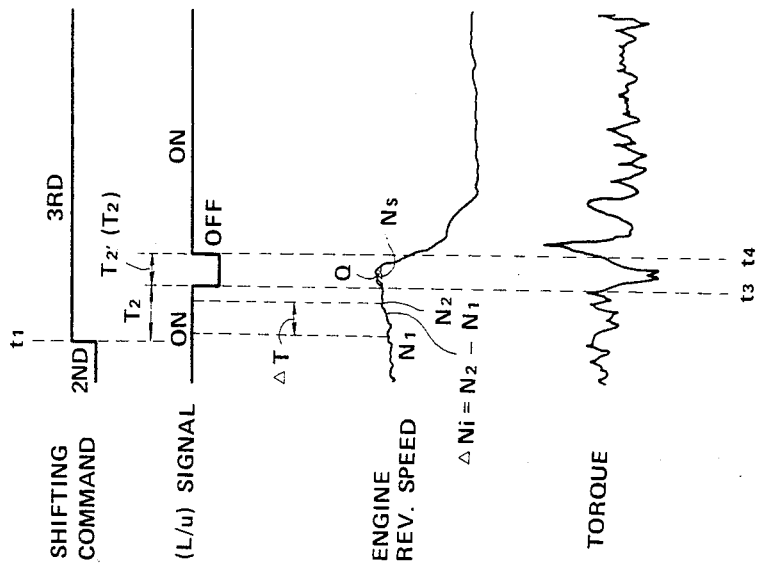
FIG. 8(a) is a timing diagram for explaining the conventional control previously discussed.
FIG. 8(b) is a similar timing diagram to FIG. 8(a) used to explain the operation of the control according to the present invention.
Figure 8:
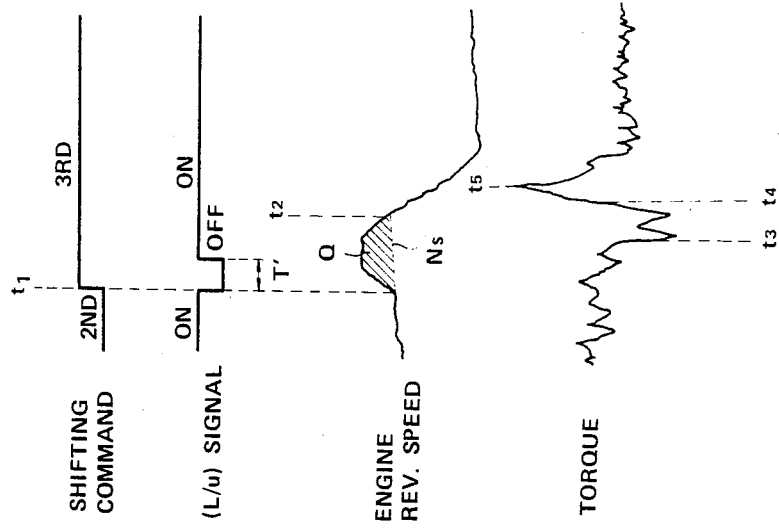

After the shift flag has been switched ON, i.e., in shifting, the control proceeds from step 212 to step 216 where a decision is made whether the lock-up action has been interrupted or not in terms of whether a lock-up interrupt flag, which will be described later, is ON or OFF. If the lock-up interrupt flag is switched OFF indicating that the lock-up action has not yet been interrupted, a variation in engine revolution speed Ni which has been read in with respect to a unit time (tendency in variation in engine revolution speed) is computed in step 217. As shown in FIG. 8(b), the computation of the variation $\Delta Ni/\Delta T$ is carried out by dividing a difference $\Delta Ni$ ($\Delta Ni = N2 - N1$) by a unit time $\Delta T$, where N2 represents an engine speed read in during the present routine, and N1 represents an engine revolution speed read in during a preceeding routine which took place predetermined times ($\Delta T$) prior to the present routine.

Then, the program proceeds to step 218 where a decision is made whether the previously mentioned lock-up interrupter timer has measured a predetermined time T1 (see FIG. 8(b)) or not. If it has measured the predetermined time, it is assumed that actual shifting is about to begin and a lock-up interrupt signal is output in step 219. This signal is equivalent to the L level of the lock-up control signal 210 and causes the deenergization of the lock-up solenoid 31, resulting in shifting the torque converter into the converter state thereof even during operation in the lock-up range (lock-up being interrupted). In a subsequent step 220, the engine revolution speed Ni which has been read in during the present routine is stored as Nm, and then after starting a lock-up interrupt release timer in step 221, the lock-up interrupt flag, which indicates that lock-up action has been interrupted, is switched ON in step 222 before the program ends. If, in the step 218, the decision made results in that the lock-up interrupt timer has not yet measured the predetermined time T1, it is apparent that actual shifting has not yet begun and the elapse of time is within the predetermined time T1 as viewed in FIG. 8(b), thus permitting the program to end.

After the lock-up action has been interrupted as indicated by the lock-up interrupt flag being switched ON, the step 216 selects step 223. In step 223, a decision is made whether the interruption of the lock-up action has been released or not, i.e., whether or not the torque converter has reassumed the lock-up state thereof after the lock-up action was interrupted, by seeing whether a lock-up (L/u) flag which will be later described is ON or OFF. If the lock-up flag is switched OFF and the lock-up action remains interrupted, the control proceeds to step 224 where a decision is made whether the previously mentioned lock-up interrupt timer has measured a predetermined time T2 (see FIG. 8(b)) or not. If it has measured the predetermined time T2, it is assumed that the actual shifting has completed and the lock-up operation signal is output in step 225. This signal is equivalent to the H level of the lock-up control signal and causes energization of the lock-up solenoid 31, allowing the torque converter 1 to reassume the lock-up state thereof (the interruption of the lock-up being released). And in the subsequent step 226, the lock-up flag, which indicates that the interruption of the lock-up has been released, is switched ON and the control proceeds to step 227. If, in the step 223, the decision made is that this lock-up flag is ON and the interruption of the lock-up has been released, or if, in step 224, the decision made is that the lock-up release timer has not yet measured the predetermined time T2 indicating that the actual shifting operation continues, the control proceeds to step 227 without carrying out steps 225 and 226.

In step 227, an estimated engine revolution speed Ns is obtained by computation based on the stored engine revolution speed value Nm, the tendency in variation in engine revolution speed $\Delta Ni/\Delta T$ and the measured time T2' (the time elasped from the interruption of the lock-up) by the lock-up interrupt release timer (see FIG. 8(b)). In the subsequent step 228, a difference $\Delta N'$ between this estimated engine revolution speed Ns and the actual engine revolution speed Ni using an equation $\Delta N' = Ni - Ns$, and then in step 229, a decision is made whether this difference $\Delta N'$ is less than or equal to zero or not, i.e., whether or not Ni is less than or equal to Ns. If the difference $\Delta N'$ is greater than zero, the control proceeds to step 230 where the difference $\Delta N'$ is added to a previously obtained integral value Q to give a new integral value Q which indicates the total of the difference in each of the routines as long as Ni is greater than Ns, i.e., time integration of the difference $\Delta N'$ being carried out as long as Ni is greater than Ns, before the execution of the program ends.

If, in step 229, $\Delta N'$ is less than or equal to zero, i.e., Ni is less than or equal to Ns, the control proceeds to step 231 where a decision is made whether or not the integral value Q falls in a predetermined range bounded by a lower limit of zero and an upper limit of Q1, i.e., $0 < Q \leq Q1$, as long as Ni remains less than or equal to Ns. If Q is greater than zero and less than or equal to Q1, the instant at which the lock-up is interrupted coincides with the instant t3 at which actual shifting begins to take place, viz., $T1 = t3 - t1$, and thus there is no fear that engine racing or substantial shift shocks might take place. Thus, there is no need to alter the predetermined time T1 and the control proceeds to step 232 where the shift flag is switched OFF before the program ends. If, on the contrary, the decision made in step 231 is that Q falls outside of the predetermined range as defined by $0 < Q \leq Q1$, the predetermined time T1 needs correction in the following manner because the current time T1 is not suitable and causes the occurrence of engine racing or substantial shift shocks.

That is, in step 233, a decision is made whether or not Q is equal to zero. If Q is equal to zero, the current time T1 is too long and the timing when the lock-up is to be interrupted is delayed from the instant when the actual shifting begins to take place, causing the substantial shocks to take place, and thus the control proceeds to step 234 where the time T1 is decreased or shortened by a predetermined value $\Delta T1$. On the other hand, if Q is not equal to zero, Q is greater than Q1 and the current time T1 is too short, causing the interruption of the lock-up to take place, far earlier than the instant when the actual shifting begins to take place, thus allowing the engine to race. In this case, the control proceeds to step 235 where the time T1 is increased or elongated by the predetermined value $\Delta T1$. After executing the step 234 or 235, the step 232 is executed before the program ends.

With the time T1 which has been corrected in the above manner, the interruption of the lock-up action upon shifting operation is carried out as previously described, so that the instant when the interruption of the lock-up takes place can be always timed with the instant when the actual shifting begins to take place. Thus, engine racing and substantial shift shocks owing to poor adjustment of timing of interrupting the lock-up are securely prevented.

If the RAM 203 shown in FIG. 5 is made of a non-volatile memory, the time T1 which has been corrected to an appropriate value in the previously mentioned manner remains stored even if the source of electric power is disconnected, thus allowing the lock-up interrupt control to be carried out based on the appropriate time T1 upon connecting with the source of electricity again, providing a convenience that the engine racing and the substantial shocks are prevented from the very beginning immediately after connecting to the source of electricity.

What is claimed is:

1. A lock-up control system for a lock-up type automatic transmission for a vehicle having an engine, the automatic transmission including a lock-up type torque converter having an input element drivingly connected to the engine, an output element and a bridge clutch which, when engaged, mechanically interconnects the input element and the output element, said lock-up control system, comprising:

means for detecting a command for shifting in the automatic transmission and generating a shifting command indicative signal;

means responsive to said shifting command indicative signal for temporarily releasing engagement of the bridge clutch;

means for estimating an engine revolution speed after an instant when the bridge clutch is temporarily released and generating an estimated engine revolution speed indicative signal;

means for detecting an actual engine revolution speed and generating an actual engine revolution speed indicative signal;

means for integrating a difference between said estimated engine revolution speed indicative signal and said actual engine revolution speed indicative signal to give an integral value and generating an integral value indicative signal; and means for determining said instant in such a manner as to decrease a difference between said integral value and a predetermined value.

2. A lock-up control system as claimed in claim 1, wherein said determining means adjusts said instant by correcting a predetermined elapsed time from an instant when said command for shifting has took place.

3. A lock-up control system as claimed in claim 1, wherein said integrating means continues to integrate said difference between said estimated engine revolution speed and said actual engine revolution speed from said instant when said bridge clutch is temporarily released to an instant when said difference between said estimated engine revolution speed and said actual engine revolution speed substantially agrees to a predetermined value.

4. A lock-up control system as claimed in claim 1, wherein said estimated engine revolution speed indicative signal generating means estimates an estimated engine revolution speed on a variation tendency in engine revolution speed immediately before said instant when the bridge clutch is temporarily released.

5. A lock-up control system as claimed in claim 1, wherein said determining means includes a non-volatile memory for storing the determined instant.

6. A method for controlling a lock-up in a lock-up type automatic transmission for a vehicle having an engine, the automatic transmission including a lock-up type torque converter having an input element drivingly connected to the engine, an output element and a bridge clutch which, when engaged, mechanically interconnects the input element and the output element, said lock-up control system, comprising the steps of:

detecting a command for shifting in the automatic transmission and generating a shifting command indicative signal;

temporarily releasing engagement of the bridge clutch responsive to said shifting command indicative signal;

estimating an engine revolution speed after an instant when the bridge clutch is temporarily released and generating an estimated engine revolution speed indicative signal;

detecting an actual engine revolution speed and generating an actual engine revolution speed indicative signal;

integrating a difference between said estimated engine revolution speed indicative signal and said actual engine revolution speed indicative signal to give an integral value and generating an integral value indicating signal; and determining said instant in such a manner as to decrease a difference between said integral value and a predetermined value.

* * * * *